(12) United States Patent
Yamada et al.

(10) Patent No.: US 8,529,075 B2
(45) Date of Patent: Sep. 10, 2013

(54) ANTIREFLECTION STRUCTURE, OPTICAL UNIT, AND OPTICAL DEVICE

(75) Inventors: Kazuhiro Yamada, Osaka (JP); Takamasa Tamura, Osaka (JP); Yasuhiro Tanaka, Hyogo (JP)

(73) Assignee: Panasonic Corporation, Osaka (JP)

( * ) Notice: Subject to any disclaimer, the term of this patent is extended or adjusted under 35 U.S.C. 154(b) by 788 days.

(21) Appl. No.: 12/676,083

(22) PCT Filed: Sep. 3, 2008

(86) PCT No.: PCT/JP2008/002421
§ 371 (c)(1),
(2), (4) Date: Mar. 2, 2010

(87) PCT Pub. No.: WO2009/031299
PCT Pub. Date: Mar. 12, 2009

(65) Prior Publication Data
US 2010/0165468 A1  Jul. 1, 2010

(30) Foreign Application Priority Data
Sep. 3, 2007  (JP) ................................. 2007-227799

(51) Int. Cl.
*G02B 5/22* (2006.01)
*G02B 7/02* (2006.01)

(52) U.S. Cl.
USPC .......................................... 359/614; 359/613

(58) Field of Classification Search
USPC .......................................... 359/601, 614, 613
See application file for complete search history.

(56) References Cited

U.S. PATENT DOCUMENTS

| | | | | |
|---|---|---|---|---|
| 4,589,972 A | * | 5/1986 | Pompea et al. | 205/205 |
| 5,018,832 A | * | 5/1991 | Terunuma et al. | 359/601 |
| 5,121,251 A | * | 6/1992 | Edwards | 359/368 |
| 5,208,599 A | * | 5/1993 | Rudduck et al. | 342/4 |
| 5,212,596 A | * | 5/1993 | Andrus | 359/614 |
| 5,225,933 A | * | 7/1993 | Myers et al. | 359/614 |

(Continued)

FOREIGN PATENT DOCUMENTS

JP   56065101 A  *  6/1981
JP   2001-127852   5/2001

(Continued)

OTHER PUBLICATIONS

International Search Report for corresponding Application No. PCT/JP2008/002421 mailed Dec. 16, 2008.

(Continued)

*Primary Examiner* — Mark Consilvio
(74) *Attorney, Agent, or Firm* — Renner, Otto, Boisselle & Sklar, LLP

(57) ABSTRACT

An antireflection structure having a high antireflection effect is provided.

An antireflection structure (50) reduces reflection of light having a wavelength equal to or larger than a predetermined wavelength, and absorbs the light whose reflection is reduced. The antireflection structure (50) includes a base structure portion (7) which is configured to have a plurality of structural units (70) arranged on a reference plane, and each having a tilted surface (71) so that an angle between the first side surface (71) and a reference plane (51) is a predetermined angle, and a plurality of fine concave/convex portions (8, 8, . . . ) which are formed on a surface of the base structure portion (7), and arranged within a cycle equal to or smaller than the predetermined wavelength.

14 Claims, 8 Drawing Sheets

(56) References Cited

U.S. PATENT DOCUMENTS

| | | | | |
|---|---|---|---|---|
| 5,335,114 | A * | 8/1994 | Suzuki | 359/602 |
| 5,817,396 | A * | 10/1998 | Perlo et al. | 428/141 |
| 6,359,735 | B1 | 3/2002 | Gombert et al. | |
| 6,606,195 | B2 * | 8/2003 | Tsuji | 359/566 |
| 7,297,386 | B2 * | 11/2007 | Suzuki et al. | 428/141 |
| 7,850,319 | B2 * | 12/2010 | Yoshikawa et al. | 359/614 |
| 2006/0061868 | A1 | 3/2006 | Hattori et al. | |
| 2006/0227834 | A1 | 10/2006 | Yoshikawa et al. | |
| 2007/0195417 | A1 * | 8/2007 | Yamamoto et al. | 359/590 |
| 2007/0291386 | A1 * | 12/2007 | Yoshikawa et al. | 359/885 |
| 2010/0128350 | A1 * | 5/2010 | Findlay et al. | 359/601 |
| 2010/0271706 | A1 * | 10/2010 | Yamada et al. | 359/614 |
| 2011/0051251 | A1 * | 3/2011 | Endoh et al. | 359/614 |

FOREIGN PATENT DOCUMENTS

| | | |
|---|---|---|
| JP | 2001-517319 | 10/2001 |
| JP | 2002-169225 | 6/2002 |
| JP | 2003-053867 | 2/2003 |
| JP | 2005-234554 | 9/2005 |
| JP | 2006-065302 | 3/2006 |
| JP | 2006-285223 | 10/2006 |

OTHER PUBLICATIONS

Form PCT/ISA/237, Dec. 16, 2008.

Daniel H. Raguin and G. Michael Morris, "Analysis of antireflection-structured surfaces with continuous one-dimensional surface profiles", Applied Optics, vol. 32, No. 14, 2582-2598 (1993) (cited on p. 2, line 17 of the specification).

* cited by examiner

ANTIREFLECTION STRUCTURE, OPTICAL UNIT, AND OPTICAL DEVICE

TECHNICAL FIELD

The present invention relates to antireflection structures for reducing reflection of light having a wavelength equal to or larger than a predetermined wavelength, and absorbing the light whose reflection is reduced, an optical unit, and an optical device.

BACKGROUND ART

In recent years, there have been proposed various kinds of optical elements in which an antireflection treatment for reducing reflection of light is performed to a surface. Antireflection treatments include, for example, a treatment in which an antireflection film is formed of a film (low refractive index film) having a relatively low refractive index, a multilayer film including a low refractive index film, and a film (high refractive index film) having a relatively high refractive index which are alternately stacked, or the like on a surface of an optical element (see, for example, Patent Document 1 and the like).

However, to form a low refractive index film or an antireflection multilayer film formed of a multilayer film of this type, a complicated step, such as vapor deposition, sputtering or the like, has to be performed. Therefore, there arises a problem that productivity is low and cost is high. Moreover, there is another problem that a low refractive index film or an antireflection film formed of a multilayer film exhibits large dependence on wavelength and incident angle.

In view of the above-described problems, as an antireflection treatment having relatively less dependence on incident angle and wavelength, for example, a treatment in which a fine structure is formed on an optical element surface so that concaves/convexes are regularly formed with a pitch equal to or smaller than a wavelength of incident light has been proposed (see, for example, Non-Patent Document 1, and the like). With this treatment, abrupt change in refractive index at an interface can be reduced, and a moderate change of refractive index is formed at the interface. Accordingly, reflection at the optical element surface is reduced, so that a high rate of incidence of light coming into the optical element can be obtained.

Patent Document 2 discloses a technique of forming fine concave/convex portions on a rough surface.

CITATION LIST

Patent Document

PATENT DOCUMENT 1: Japanese Patent Application No. 2001-127852
PATENT DOCUMENT 2: Japanese Translation of PCT International Application No. 2001-517319
Non-Patent Document
NON-PATENT DOCUMENT 1: Daniel H. Raguin and G. Michael Morris, Analysis of antireflection-structured surfaces with continuous one-dimensional surface profiles, Applied Optics, Vol. 32, No. 14, 2582-2598 (1993)

SUMMARY OF THE INVENTION

Technical Problem

However, even when fine concave/convex portions are formed on a surface of an optical device so as to be regularly arranged with a pitch equal to or smaller than a wavelength of incident light, there might be cases where a high antireflection effect cannot be sufficiently obtained.

In view of the above-described points, the present invention has been developed. It is an object of the present invention to provide an antireflection structure having improved antireflection performance.

Solution to the Problem

The present invention is directed to an antireflection structure for reducing reflection of light having a wavelength equal to or larger than a predetermined wavelength, and absorbing the light whose reflection is reduced. The antireflection structure includes a base structure portion which is configured to have a plurality of structural units arranged on a reference plane, and each having tilted surfaces so that an angle between each of the tilted surfaces and a reference plane is a predetermined angle, and a plurality of fine concave/convex portions which are formed on a surface of the base structure portion, and arranged within a cycle equal to or smaller than the predetermined wavelength.

An optical unit according to the present invention includes an optical system, and the antireflection structure arranged so that the light from the optical system comes therein, and the fine concave/convex portions are regularly arranged within a cycle equal to or smaller than a wavelength of the light from the optical system.

Furthermore, the optical device according to the present invention includes the optical unit.

Advantages of the Invention

According to the present invention, an antireflection structure having a high antireflection effect can be provided.

DESCRIPTION OF REFERENCE CHARACTERS

1 Imaging Apparatus (Optical Unit)
2 Lens Barrel Unit (Optical Unit)
4 Optical System
5 Lens barrel
50 Antireflection Structured Section (Antireflection Structure)
250 Antireflection Structured Section (Antireflection Structure)
350 Antireflection Structured Section (Antireflection Structure)
450 Antireflection Structured Section (Antireflection Structure)
51 Reference Plane
7 Base Structure Portion
207 Base Structure Portion
307 Base Structure Portion
407 Base Structure Portion
70 Structural Unit
270 Structural Unit
370 Structural Unit
470A Structural Unit
470B Structural Unit
71 First Side Surface (Tilted Surface)
72 Second Side Surface (Tilted Surface)
73 Third Side Surface (Tilted Surface)
74 Fourth Side Surface (Tilted Surface)
271 First Tilted Surface (Tilted Surface)
272 Second Tilted Surface (Tilted Surface)
371 Tilted Surface
372 Tilted Surface
8 Fine Concave/Convex Portions

DESCRIPTION OF EMBODIMENTS

Embodiments of the present invention will be described in detail hereinafter with reference to the accompanying drawings.

An optical device implemented in accordance with the present invention will be described herein with reference to an imaging apparatus as an example. However, the optical device according to the present invention is not limited to the imaging apparatus and may be, for example, some other optical devices such as an illumination device, a projector and the like.

First Embodiment

Figure 2:
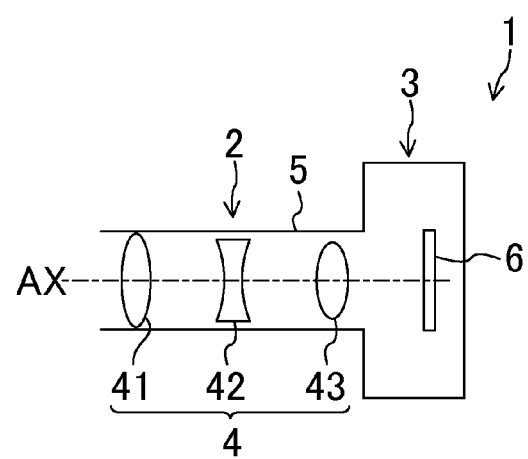
FIG. 2 is a schematic view showing a structure of main part of an imaging apparatus according to the first embodiment.

FIG. 2 is a schematic view illustrating a structure of main part of an imaging apparatus according to a first embodiment.

The imaging apparatus 1 includes a device body 3 and a lens barrel unit 2 as an optical unit. The imaging apparatus 1 constitutes the optical device. In this embodiment, an example in which the lens barrel unit 2 is mounted to the device body 3 will be described. However, the lens barrel unit 2 may be configured, for example, so as to be removable with respect to the device body 3.

The lens barrel unit 2 includes a lens barrel 5 having a cylindrical shape (specifically, a circular cylindrical shape) and an optical system 4 contained in the lens barrel 5. The device body 3 includes an imaging apparatus 6 placed on an optical axis AX of the optical system 4. The optical system 4 forms an optical image on an image area of the imaging apparatus 6. An optical image formed on an imaging area by the optical system 4 is converted into an electrical signal by the imaging apparatus 6. Then, for example, the electrical signal is stored in a memory (or an external memory) provided in the device body 3 and output to some other devices via a cable connected to the device body 3. The imaging apparatus 6 can be formed of a CCD (charge coupled device), a CMOS (complementary metal-oxide semiconductor) or the like.

The optical system 4 is not particularly limited to a certain configuration as long as it can preferably form an optical image on an imaging area of the imaging apparatus 6. For example, as shown in FIG. 2, the optical system 4 may include three lenses (or lens groups), i.e., a first lens (group) 41, a second lens (group) 42 and a third lens (group) 43. Alternatively, the optical system 4 may have a configuration in which at least one of the three lenses (lens groups) 41-43 is movable in the optical axis AX direction, so that focusing and/or scaling are allowed.

Figure 3:
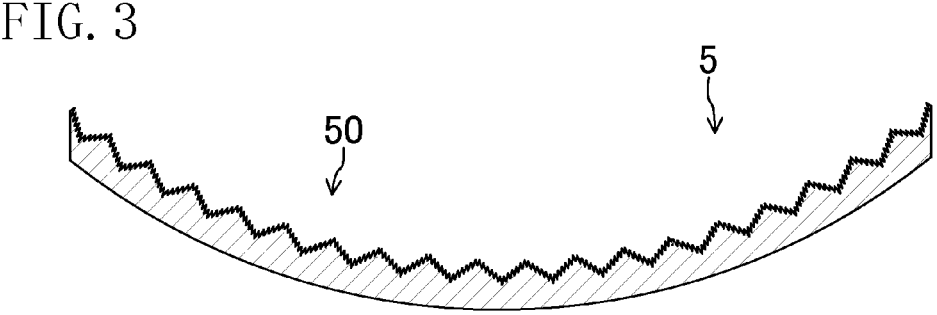
FIG. 3 is an enlarged view of part of a lens barrel.

As shown in FIG. 3, the lens barrel 5 is provided with an antireflection structured section 50 for reducing the reflection of light by transmitting and diffusing the light on the inner circumference surface thereof. The lens barrel 5 constitutes a lens barrel, and the antireflection structured section 50 constitutes an antireflection structure.

Figure 1:
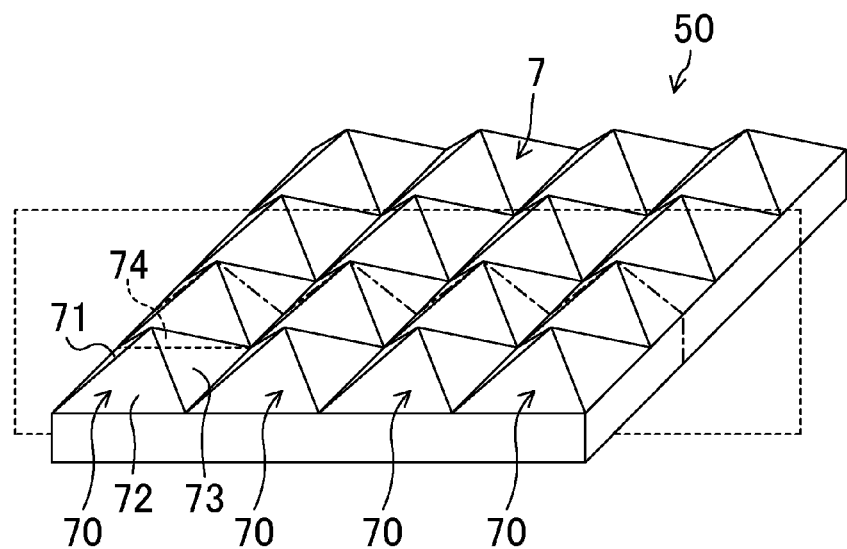
FIG. 1 is a perspective schematic view showing an antireflection structure according to a first embodiment.

Specifically, as shown in FIG. 1, a base structure portion 7 in which structural units 70, 70, . . . each of which has a quadrangular pyramidal shape are arranged is formed on a surface of the antireflection structured section 50, and fine concave/convex portions 8, 8, . . . are formed on a surface of the base structure portion 7. The material of the antireflection structured section 50 is not particularly limited to a specific one, and may be resin or glass. Fine particles or the like may also be dispersed and mixed. In FIG. 1, to simplify illustration, a part of the antireflection structured section 50 is shown in the form of a flat plate, not in the form of a circular cylinder.

Figure 4:
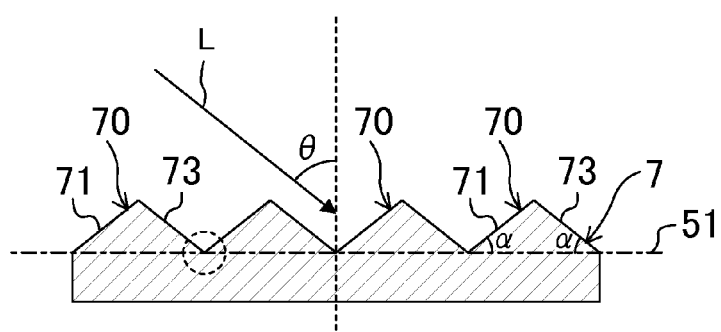
FIG. 4 is an enlarged cross-sectional view showing a base structure portion on an inner circumference surface of the lens barrel.

The shapes of the structural units 70, 70, . . . are similar to one another, and the structural units 70, 70, . . . are arranged be adjacent to one another in four directions. Each of the structural units 70 is a right pyramid or a right cone (a pyramid or a cone in which a line dropped from a vertex toward a base passes through the center of gravity of the base at right angles) formed of first-fourth side surfaces 71-74 all four of which are similar isosceles triangles. Respective angles between the reference plane 51 (a plane obtained by cutting off the base structure portion 7 and the fine concave/convex portions 8, 8, . . . as high-frequency components from the surface of the antireflection structured section 50) in the antireflection structured section 50, and each of first-fourth side surfaces 71-74, in other words, tilt angles α (acute angles of the angles between the reference plane 51 and each of the side surfaces) have the same value. In other words, when the antireflection structured section 50 is cut in a plane passing through the vertices and the center of gravity of the base of the adjacent structural units 70, 70, . . . (in other words, a plane which passes through the vertices of the adjacent structural units 70, 70, ... and which is orthogonal to the reference plane 51), the cross section of each of the structural units 70 forms an isosceles triangle, as shown in FIG. 4. These first-fourth side surfaces 71-74 constitute tilted surfaces.

Figure 5:
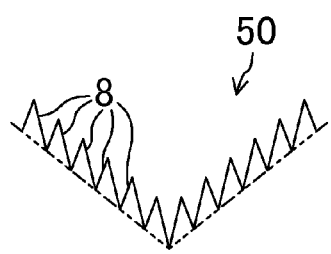
FIG. 5 is an enlarged cross-sectional view showing fine concave/convex portions on the inner circumference surface of the lens barrel in a circle indicated by a dashed line of FIG. 4.

As shown in FIG. 5, the plurality of the fine concave/convex portions 8, 8, ... which are regularly arranged are formed on the surface of the base structure portion 7 (hereinafter, an antireflection structure in which the fine concave/convex portions 8, 8, ... are formed will be occasionally referred to as "SWS"). The fine concave/convex portions 8, 8, ... are formed to have a conical shape. In this way, the fine concave/convex portions 8, 8, ... are formed on the surface of the antireflection structured section 50, so that abrupt change in refractive index between the surface of the antireflection structured section 50, and an air layer is reduced, and a refraction index is gradually changed in a surface layer portion of the surface including the fine concave/convex portions 8, 8, .... As a result, reflection at the surface of the antireflection structured section 50, i.e., the inner circumference surface of the lens barrel 5 is efficiently reduced.

As long as the fine concave/convex portions 8, 8, ... have the function of moderating the change in refractive index at an interface between the surface of the antireflection structured section 50 and the air layer, a shape of each of the fine concave/convex portions 8, 8, ... is not particularly limited. For example, each of the fine concave/convex portions 8, 8, ... may be an approximately conical concave or convex (of which a top portion may be chamfered or R-chamfered), a prismoid concave or convex (of which a top portion may be chamfered or R-chamfered, and ridge lines may be chamfered or R-chamfered), or a linear concave or a linear convex (of which a cross-sectional shape is triangular, trapezoidal, rectangular or the like, and ridge lines may be chamfered or R-chamfered).

In view of obtaining high antireflection performance, a cycle (i.e., a distance between top points of adjacent ones of the fine concave/convex portions 8, 8, ... in a direction parallel to the reference plane 51) of the fine concave/convex portions 8, 8, ... is preferably equal to or smaller than a wavelength of incident light L (preferably a cycle which is equal to or smaller than a wavelength of light having the smallest wavelength of light of the incident light L). On the contrary, a height (a length measured from a surface formed by a connection of respective bases of the fine concave/convex portions 8, 8, ..., as illustrated in a double-dotted and dashed line in FIG. 5, to each of the top portions of the fine concave/convex portions 8, 8, ..., in the normal direction of the reference plane 51) of each of the fine concave/convex portions 8, 8, ... is preferably equal to or larger than 0.4 times as large as the wavelength of the incident light L, more preferably equal to or larger than the wavelength, and even more preferably equal to or larger than three times as large as the wavelength of the incident light L. Strictly speaking, if the incident light L has a range of wavelength, the cycle of the fine concave/convex portions 8, 8, ... is preferably equal to or smaller than the smallest wavelength of the incident light L, and the height of each of the fine concave/convex portions 8, 8, ... is preferably equal to or larger than 0.4 times as large as the largest wavelength of the incident light L (more preferably equal to or larger than the longest wavelength, and even more preferably equal to or larger than three times as large as the largest wavelength).

The fine concave/convex portions 8, 8, ... do not necessarily have to exhibit antireflection performance for all incident light L. For example, when, although a wavelength of the incident light L is in a wide wavelength range including ultraviolet light, near-ultraviolet light, visible light, near-infrared light and infrared light, only reflection of light having a wavelength in the range between 400 nm to 700 nm, both inclusive, may be reduced, the cycle of the fine concave/convex portions 8, 8, ... is preferably equal to or smaller than 400 nm. The height of each of the fine concave/convex portions 8, 8, ... is preferably equal to or larger than 0.4 times as large as 700 nm, i.e., 280 nm or more.

The fine concave/convex portions 8, 8, ... may be formed so that the respective heights of the fine concave/convex portions 8, 8, ... differ from one another. However, in view of simplification of fabrication, the fine concave/convex portions 8, 8, ... are preferably formed so as to have approximately the same height. When, for example, the fine concave/convex portions 8, 8, ... include conical/pyramidal concaves and conical/pyramidal convexes, the fine concave/convex portions 8, 8, ... are preferably formed so that center axes of the cones/pyramids, each formed by a connection between the center of gravity of a base and a vertex of the cone/pyramid, are approximately in parallel to one another. In this case, fabrication of the fine concave/convex portions 8, 8, ... by injection molding is simple. On the contrary, for the same reason, when the fine concave/convex portions 8, 8, ... include linear concaves and linear convexes each having a triangular cross section, the plurality of fine concave/convex portions 8, 8, ... are preferably formed so that center axes of the linear portions, each formed by a connection between the center of gravity of the base and a vertex of the linear portion in a cross section, are approximately in parallel to one another in each area (for example, an area having a size of 1 mm squares).

The antireflection structured section 50 having the above structure will be machined as indicated below. First, a smooth surface of a plate member is cut by a cutting tool having a blade forming an angle with the surface, where the angle is similar to the tilt angle α0 of the side surface of the structural unit 70. Specifically, the cutting tool is placed on the surface of the plate member to be allowed to move in two directions orthogonal to each other while cutting the surface, and therefore valley portions each of which is located between the adjacent structural units 70 and 70 are sequentially machined. As a result, the structural units 70, 70, ... each having a quadrangular pyramidal shape are formed on the surface of the plate member. Then, the fine concave/convex portions 8, 8, ... are formed on surfaces of the structural units 70, 70, ... by a method of X-ray lithography or two-beam interference (holographic) exposure. In this way, the structural units 70, 70, ... each having a quadrangular pyramidal shape are formed on the surface, and the fine concave/convex portions 8, 8, ... are further formed on the surfaces of the structural units 70, 70, ..., thereby forming the antireflection structured section 50. The antireflection structured section 50 in the form of a flat plate with such a method is bonded to an inside of the lens barrel 5. After the antireflection structured section 50 is once formed, a molding die may be formed by the antireflection structured section 50 as a master, and other antireflection structured sections 50 may be sequentially produced by injection molding or the like.

The antireflection structured section 50 may be a member having a circular cylindrical shape fit into the inside of the lens barrel 5. The antireflection structured section 50 may also be integrally formed with the lens barrel 5, in other words, may be directly formed on the inner circumference of the lens barrel 5.

As described above, the fine concave/convex portions 8, 8, ... are formed on the surface of the antireflection structured section 50, thereby making it possible to reduce reflection of light on the surface. However, if the surface of the antireflection structured section 50 is smooth, the reflection of light on the surface cannot be sufficiently reduced.

Figure 6:
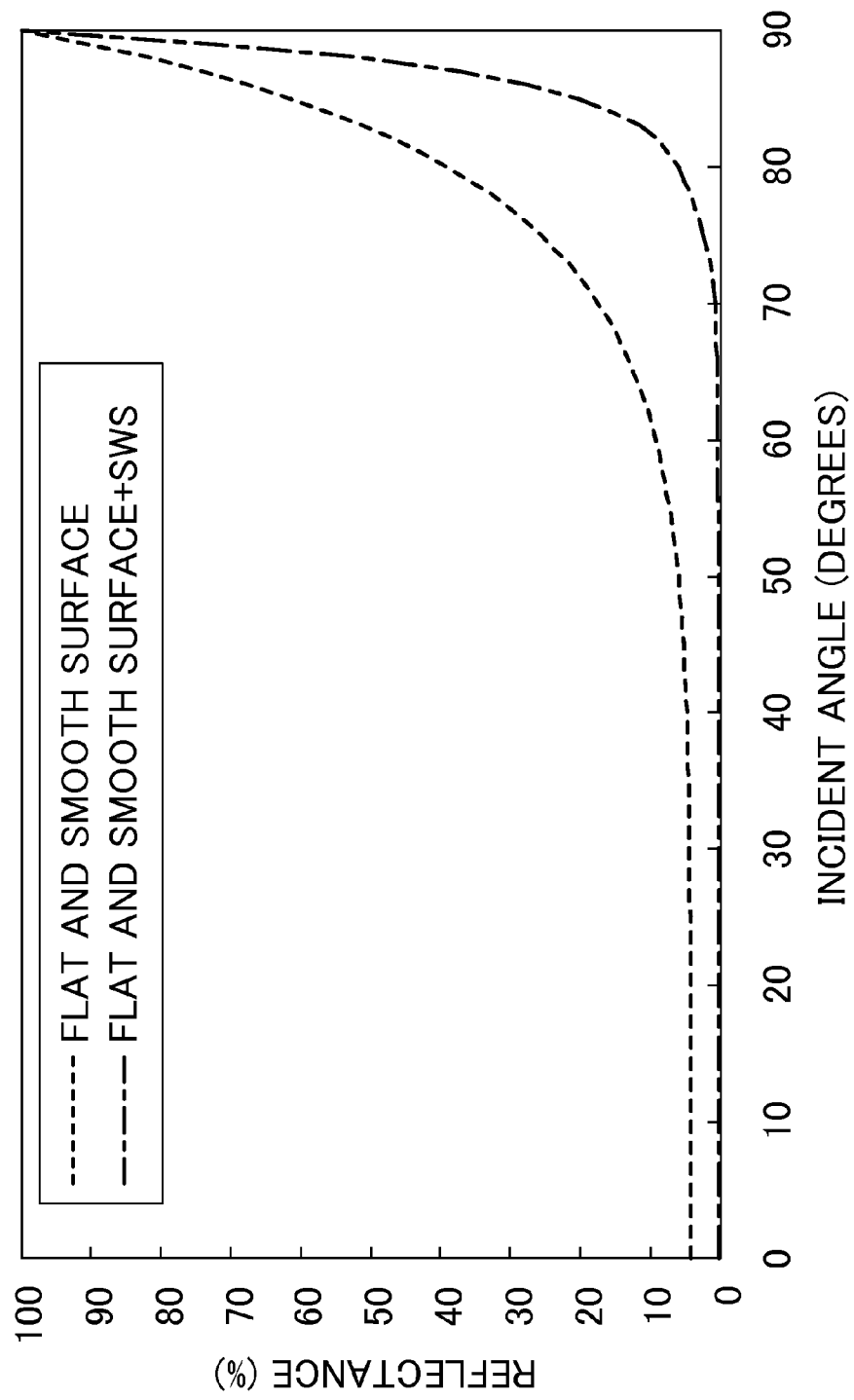
FIG. 6 is a graph showing a correlation between incident angles and reflectances in the antireflection structure formed on a flat and smooth surface, and a correlation between incident angles and reflectances in the antireflection structure in which the fine concave/convex portions are formed on a flat and smooth surface.
Figure 7:
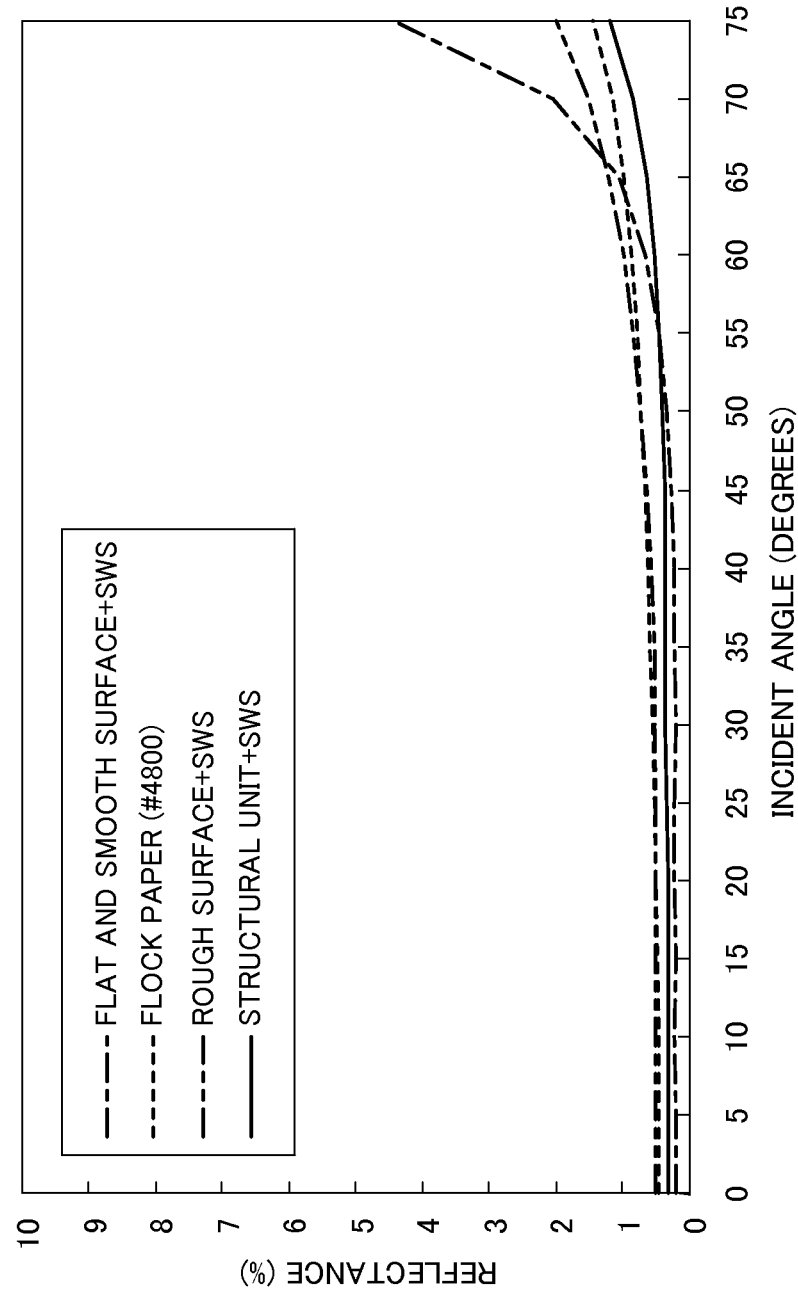
FIG. 7 is a graph showing a correlation between incident angles and reflectances in the antireflection structure in which the fine concave/convex portions are formed in the base structure portion, and a correlation between incident angles and reflectances in antireflection structures according to comparative examples.

For example, as shown in FIG. 6, when the fine concave/convex portions 8, 8, . . . (SWS) are formed on a flat and smooth surface (a dash-dotted line in the figure), reflectance can be reduced compared with a structure in which a flat and smooth surface (a dashed line in the figure) having no the fine concave/convex portions 8, 8, . . . thereon, but the reflectance for incident light at a relatively large incident angle cannot be sufficiently reduced. Specifically, when the SWS is formed on a flat and smooth surface, reflectance is increased after an incident angle exceeds 50 degrees, so that dependence of the reflectance on incident angle cannot be sufficiently reduced. The graph of FIG. 6 is obtained by a computer simulation based on RCWA (Rigorous Coupled Wave Analysis) method for calculating reflectances. FIG. 7 shown hereinafter is a result of reflectances measured when various specimens are exposed to incident light while an incident angle of the incident light is changed. The reflectances are calculated based on the total amount of reflected light including specular light, diffuse reflection light, and diffracted light measured by a integrating sphere (so called hemispherical reflectance).

In other words, reflectance depends on incident angle by nature, and as the incident angle becomes larger, the reflectance becomes larger. The structure of forming the fine concave/convex portions, 8, 8, . . . on the flat and smooth surface cannot reduce dependence of the reflectance on incident angle.

On the contrary, according to this embodiment, the fine concave/convex portions, 8, 8, . . . are formed on the surfaces of the structural unit 70, 70, . . . each having a quadrangular pyramidal shape, and in this structure, dependence of the reflectance on incident angle can be reduced, thereby gaining a high antireflection effect for incident light even at a relatively large incident angle.

Specifically, suppose that an incident plane (see a dashed line in FIG. 1) defined as a plane including incident light L and outgoing light passes through the vertices of the structural units 70, 70, . . ., and are orthogonal to the first side surface 71 and the third side surface 73 (see FIGS. 1 and 4). When the incident light L enters the reference plane 51 at an incident angle $\theta$, the incident angle of the incident light L for the first side surface 71 is $(\theta-\alpha)$ since the first side surface 71 of the structural unit 70 is tilted at the tilt angle $\alpha$ with respect to the reference plane 51.

Suppose that the incident light L enters the reference plane 51 at various angles ranging from 0° to 90°. Since the first side surface 71 is tilted, the incident angle with the first side surface 71 ranges from $-\alpha°$ to $(90-\alpha)°$ (an incident angle with the normal direction of the side surface closer to the side of the normal direction of the reference plane 51 is defined as a negative value, and an incident angle with the normal direction of the side surface closer to the side of a direction parallel to the reference plane 51 is defined as positive value). In other words, since the incident angle of the incident light L with respect to the first side surface 71 is decreased by $\alpha$, and the upper limit of the incident angles is less than 90°. On the contrary, the lower limit of the incident angles is decreased by $\alpha$ to fall below 0°. However, the absolute value $|-\alpha|$ of the maximum value of the incident angles does not exceed 90° since the value $\alpha$ is more than 0° but less than 90°.

In other words, the maximum value of the absolute value of the incident angles in the incident light L can be reduced. As a result, the reflectance for the incident light L at a relatively large incident angle with respect to the reference plane 51 can be sufficiently reduced.

In this case, the incident angle of the incident light L with respect to the third side surface 73 facing the first side surface 71 is $(\theta+\alpha)$, which is larger than the incident angle $\theta$ with respect to the reference plane 51. However, an projected area of the third side surface 73 toward an incident direction of the incident light L is far smaller than a projected area of the first side surface 71 toward the incident direction of the incident light L. In other words, the area of the third side surface 73 viewed along the incident direction of the incident light L is far smaller than that of the first side surface 71, and an effect on reflectance in the entire inner circumference of the lens barrel 5, caused by the incident angle of the incident light L with respect to the third side surface 73 which is larger than the incident angle $\theta$ with respect to the reference plane 51, is extremely small.

Specifically, as shown in a solid line of FIG. 7, when the SWS is formed on the surfaces of the structural units 70, 70, . . . each of which has a quadrangular pyramidal shape, the reflectance for light at a relatively large incident angle can be sufficiently reduced, and the reflectance is 1% which is extremely low even if the incident angle exceeds 70 degrees. Further, in the structure in which the SWS is formed on the surfaces of the structural units 70, 70, . . . each having a quadrangular pyramidal shape, the reflectance can be reduced more efficiently than a structure of including a flock paper (#4800) shown in a dashed line of FIG. 7. In this structure, each of the tilt angles $\alpha$ of the structural units 70 with respect to the reference plane 51 is 30°.

Each of the tilt angles $\alpha$ of the first-fourth surfaces 71-74 is preferably at least 5° or more in order to reduce the maximum value of the absolute value of the incident angles in the incident light L. The tilt angle $\alpha$ is 5 degrees or more, thereby sufficiently exhibiting the advantage for reducing the incident angle of the incident light L.

The tilt angle $\alpha$ is more preferably 45°. When the tilt angle $\alpha$ of 45°, the incident light L entering the reference plane 51 at incident angles ranging from 0° to 90° enters the first-fourth side surfaces 71-74 at incident angles ranging from $-45°$ to 45°, thereby making it possible to reduce the maximum value of the absolute value of the incident angles of the incident light L with respect to the first-fourth side surface 71-74 to be 45° or less, regardless of the incident angles of the incident light L entering the reference plane 51.

A structure of forming the SWS on a rough surface having a preferable surface roughness may be applicable other than the structure of forming the SWS on the flat and smooth surface or the surfaces of the structural units, 70, 70, . . . . In this way, the surface of the antireflection structured section 50 is configured to have a rough surface, thereby making it possible to reduce the specular reflection of the incident light L. In addition, when the surface of the antireflection structured section 50 is configured to have a rough surface, the surface of the antireflection structured section 50 is tilted at various angles with respect to the reference plane 51. As a result, the incident angles of the incident light L can be substantially made small as well as the structural units 70, 70, . . ., and the reflectance of the incident light L can be reduced. Therefore, in the structure in which the SWS is formed on the surface of the antireflection structured section 50 having a rough surface, compared to the structure (see a dash-dotted line of FIG. 7) in which the SWS is formed on the flat and smooth surface, the dependence of the reflectance on incident angle can be sufficiently reduced (see a double-dotted and dashed line of FIG. 7) while the specular reflection of the incident light L is reduced.

However, in the structure in which the SWS is formed on the rough surface, as shown in the double-dotted and dashed line of FIG. 7, the reflectance is slightly larger than the structure in which the SWS is formed on the surfaces of the structural units 70, 70, . . . . Since the surface of the antireflection structured section 50 is configured to have a rough surface, the surface of the antireflection structured section 50 is tilted with respect to the reference plane 51. However, since this structure has the rough surface, the tilt angle may have various values, and a small tilt angle (for example, 0 degree), i.e., an angle which causes a small advantage for reducing the incident angle of the incident light L is included. The effect caused by the structure in which the surface of the antireflection structured section 50 is tilted with respect to the reference plane 51 is smaller than that caused by the structure of having the structural units 70, 70, . . . .

Therefore, the structural units 70, 70, . . . are formed on the surface of the antireflection structured section 50, and the SWS is formed on the structural units 70, 70, . . . , thereby more sufficiently reducing the reflectance of the incident light L than the structure in which the SWS is formed on the surface of the antireflection structured section 50 configured to have a rough surface.

Further, a method of forming the surface of the antireflection structured section 50 to have a rough surface includes sandblasting or the like. However, it is difficult to produce the shape of the rough surface while controlling the shape of the rough surface, i.e., tilt angles of the rough surface. By contrast, the structural units 70, 70, . . . are formed by machining, such as cutting of the surface of the antireflection structured section 50 with a cutting tool or the like, and therefore, each of the structural units 70 is easily formed to have a desired shape.

Figure 8:
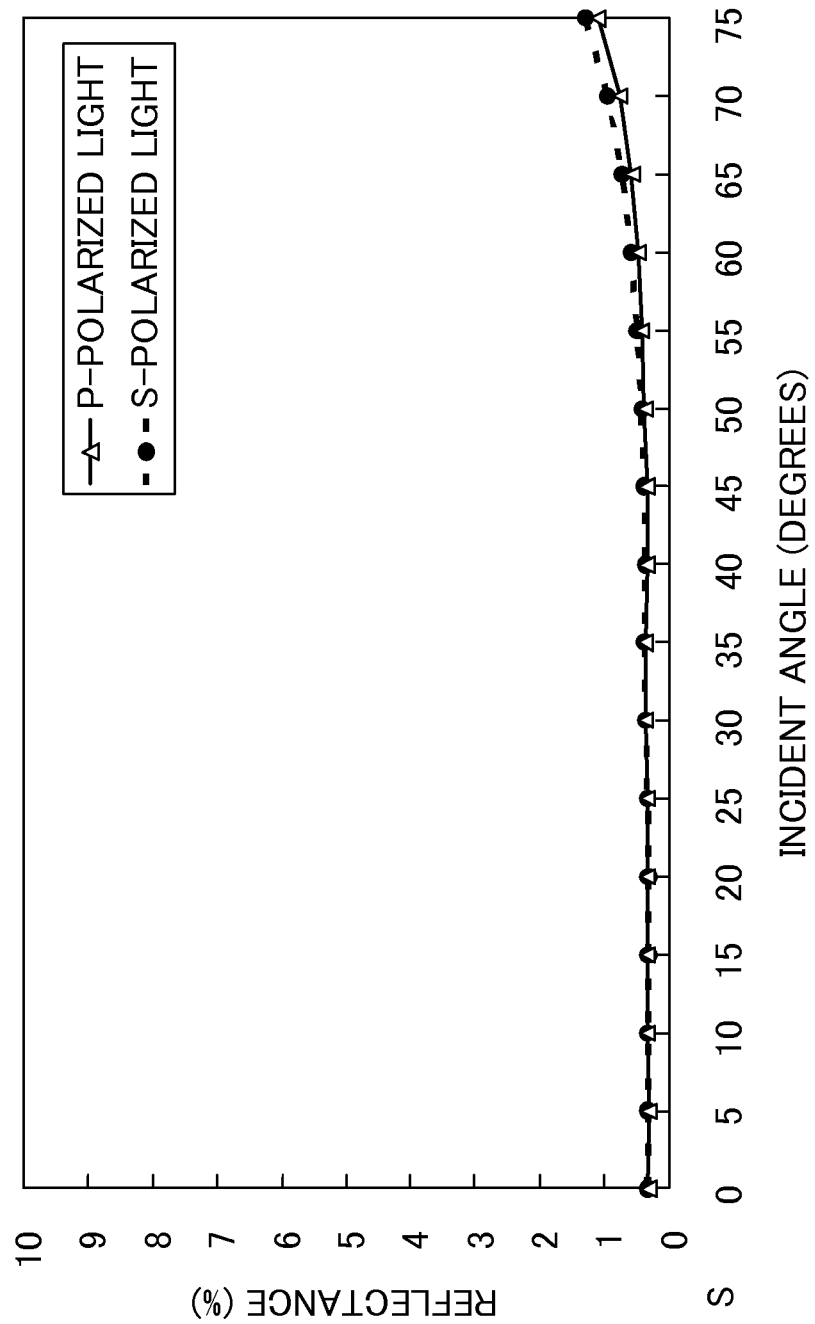
FIG. 8 is a graph showing correlations between incident angles and reflectances with respect to p-polarized light and s-polarized light in the antireflection structure in which the fine concave/convex portions are formed in the base structure portion.

Further, each of the structural units 70, 70, . . . has a quadrangular pyramidal shape, and therefore, the antireflection structured section 50 has a surface including substantially similar shapes with respect to two directions which are orthogonal to each other as viewed in plan. As shown in FIG. 8, the reflectance of the p-polarized light of the incident light L is substantially similar to that of the s-polarized light of the incident light L, thereby making it possible to reduce polarization dependence.

Therefore, according to the first embodiment, with the formation of the fine concave/convex portions 8, 8, . . . on the surface of the antireflection structured section 50, a refraction index is gradually changed in a surface layer portion of the inner circumference surface of the lens barrel 5, thereby making it possible to reduce the reflectance. Further, with the formation of the fine concave/convex portions, 8, 8, . . . on the respective surfaces of he structural units 70, 70, . . . each including the side surfaces 71-74 tilted with respect to the reference plane 51 of the antireflection structured section 50, the incident angle of the incident light L becomes substantially small, thereby making it possible to reduce dependence of the reflectance on angle.

Further, with the formation of the structural units 70, 70, . . . on the surface of the antireflection structured section 50 on which the fine concave/convex portions 8, 8, . . . are formed, the tilt angles of the surface of the antireflection structured section 50 are easily formed to have a desired value, the antireflection structured section 50 can be easily manufactured to have a desired function, and productivity can be improved, compared to the structure in which a rough surface is formed on the antireflection structured section 50, and the fine concave/convex portions 8, 8, . . . are formed on the rough surface. For example, when the surface of the antireflection structured section 50 is machined to form the structural units 70, 70, . . . , the angle of the blade of a cutting tool with respect to the reference plane 51 is changed, and therefore, the angle of the tilted surface of the structural unit 70 is changed, thereby making it possible to adjust the performance of the antireflection structured section 50. In addition, the structural units 70, 70, . . . are formed on the surface of the antireflection structured section 50 on which the fine concave/convex portions 8, 8, . . . are formed, thereby allowing the reflectance to be reduced more efficiently than the structure in which the fine concave/convex portions 8, 8, . . . are formed on the surface of the antireflection structured section 50 which is formed into a rough surface.

Further, each of the structural units 70 is formed to have a quadrangular pyramidal shape, thereby enabling the antireflection structured section 50 to have a surface including substantially similar shapes with respect to two directions which are orthogonal to each other as viewed in plan. Therefore, even if the incident light comes from any of the perpendicular directions, the similar effect of reducing the reflectance and reducing dependence of the reflectance on angle, in other words, reducing polarization dependence of the reflectance can be obtained. Further, each of the structural units 70 is formed to be a right pyramid, and therefore, all of the four side surfaces are similar to one another, thereby further reducing polarization dependence of the reflectance.

The shape of the structural unit 70 is not limited to a quadrangular pyramid. For example, it may be a triangular pyramid, or a hexagonal pyramid. It even may be a cone. In this case, a lateral surface of the cone constitutes a tilted surface. Further, the shape is not limited to a right cone or a right pyramid, and may be an oblique cone or an oblique pyramid.

Second Embodiment

Next, a second embodiment of the present invention will be described.

An antireflection structured section 250 according to the second embodiment differs from the antireflection structured section 50 of the first embodiment in a shape of a base structure portion 207. Therefore, like reference characters as those shown in the first embodiment have been used to indicate similar elements, and explanation thereof will be omitted. The different elements will mainly be described.

Figure 9:
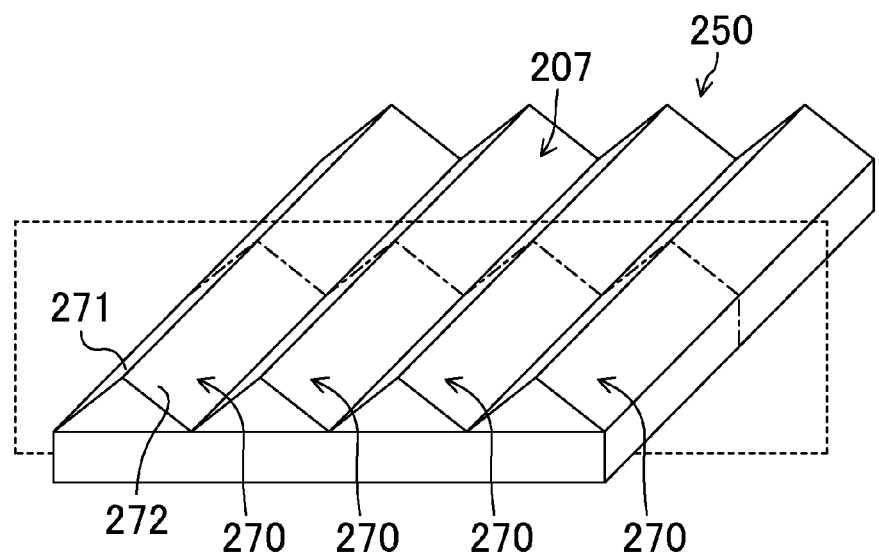
FIG. 9 is a perspective schematic view showing an antireflection structure according to a second embodiment.
Figure 10:
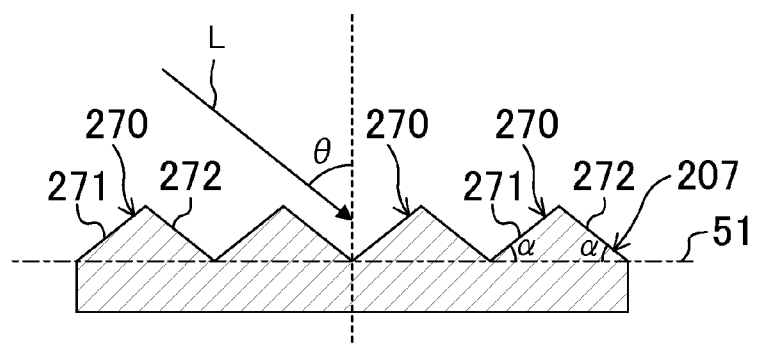
FIG. 10 is an enlarged cross-sectional view showing a base structure portion on the inner circumference surface of the lens barrel.

Specifically, as shown in FIG. 9, the base structure portion 207 including structural units 270, 270, . . . each of which extends to form a ridge and which are arranged to be adjacent to one another is formed on the surface of the antireflection structured section 250. Each of the structural units 270 is formed so as to include a first tilted surface 271 and a second tilted surface 272 tilted with respect to a reference plane 51 (a plane obtained by cutting off the base structure portion 207 and the fine concave/convex portions 8, 8, . . . as high-frequency components from the surface of the antireflection structured section 250) of the antireflection structured section 250, and to have a ridge formed of the first tilted surface 271 and the second tilted surface 272. The first tilted surface 271 and the second tilted surface 272 have the same tilt angle α with respect to the reference plane 51, and the same transverse width (i.e., a width in the array direction of the structural units 270, 270, . . . ). In other words, each of the cross-sectional shapes of the structural units 270 is an isosceles triangle, as shown in FIG. 10. The first tilted surface 271 and the second tilted surface 272 constitute a tilted surface and a second tilted surface, respectively.

A cutting tool having a blade having an angle similar to the tilt angle α of the structural unit 270 with respect to a plate member is moved to one predetermined direction to cut the plate member, thereby manufacturing a valley portion located between the structural units 270 and 270. Further, the cutting tool is moved parallel to a direction orthogonal to the one predetermined direction to sequentially shape adjacent valley portions, thereby forming the structural units 270, 270, . . . , each having a ridge extending toward the one predetermined direction, as described in the second embodiment.

The fine concave/convex portions 8, 8, . . . are formed on each of the surfaces of the structural units 270, 270, . . . as well as the first embodiment (see FIG. 5).

A case where an incident plane (see a dashed line of FIG. 9) defined as a plane including incident light L and outgoing light is parallel to a cross section of the structural units 270, 270, . . . will be described herein.

When the incident light L enters the reference plane 51 of the antireflection structured section 250 at an incident angle θ, the first tilted surface 271 of the structural unit 70 formed on the surface of the antireflection structured section 250 is tilted at the tilt angle α with respect to the reference plane 51, and the incident angle of the incident light L with the first tilted surface 271 is (θ−α), which is smaller than the incident angle θ with respect to the reference plane 51. In other words, as well as the first embodiment, the incident angle of the incident light L with the first side surface 71 is decreased by α, thereby making it possible to reduce the maximum value of the absolute value of the incident angle. As a result, the reflectance for the incident light L at a relatively large incident angle with respect to the reference plane 51 can be sufficiently reduced.

In this case, the incident angle of the incident light L with respect to the second tilted surface 272 is (θ+α), which is larger than the incident angle θ with respect to the reference plane 51. However, an projected area of the second tilted surface 272 toward the incident direction of the incident light L is far smaller than a projected area of the first tilted surface 271 toward the incident direction of the incident light L. In other words, the area of the second side surface 272 viewed along the incident direction of the incident light L is far smaller than that of the first tilted surface 271, and an effect on reflectance in the entire surface of the antireflection structured section 250, caused by the incident angle of the incident light L with respect to the second tilted surface 272 which is larger than the incident angle θ with respect to the reference plane 51, is extremely small.

Figure 11:
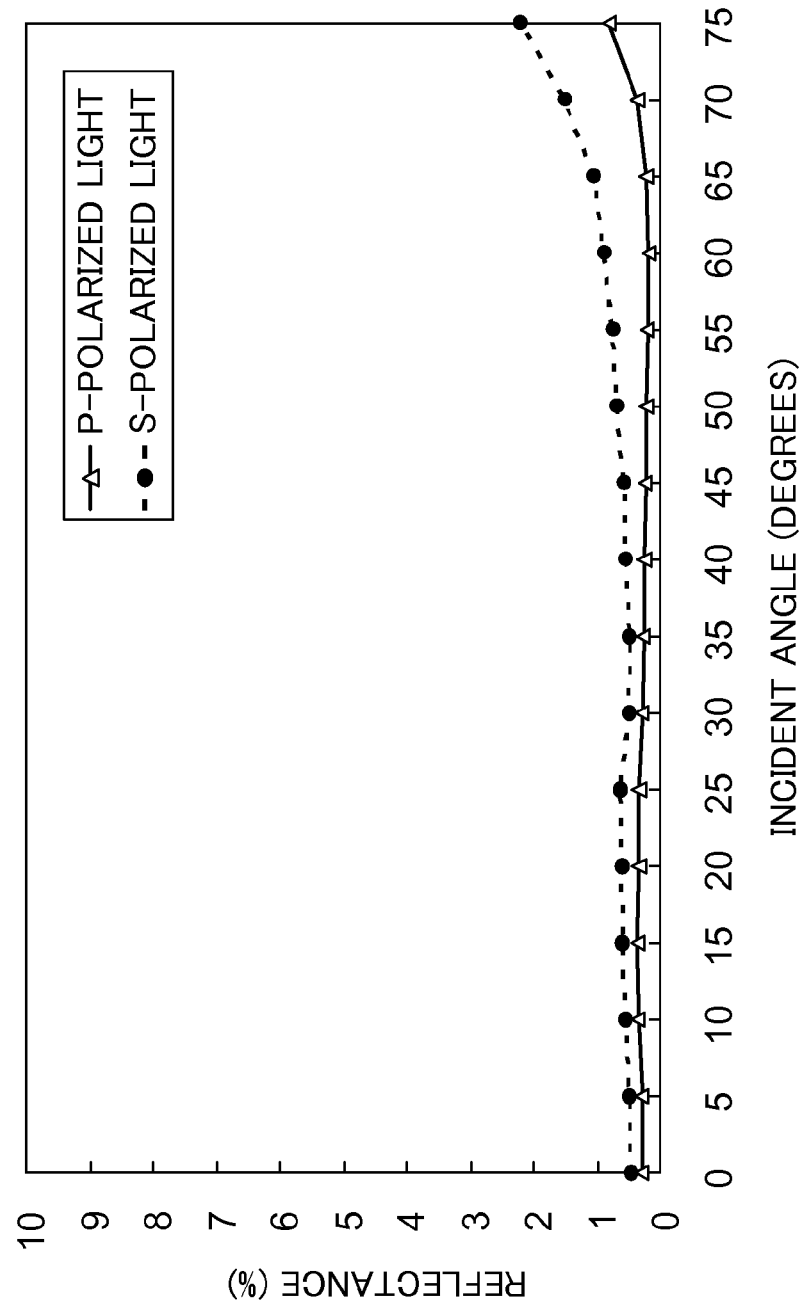
FIG. 11 is a graph showing correlations between incident angles and reflectances with respect to p-polarized light and s-polarized light in the antireflection structure in which the fine concave/convex portions are formed in the base structure portion according to the second embodiment.

The fine concave/convex portions 8, 8, . . . are formed on the surface of the surfaces of the structural units 270, 270, . . . which are formed as stated above, thereby making it possible to reduce abrupt change in refractive index at an interface between the surface of the antireflection structured section 250 and an air layer, and gradually changing a refractive index in a surface layer portion of the surface on which the fine concave/convex portions 8, 8, . . . are formed. As a result, as shown in FIG. 11, the reflectance in the surface of the antireflection structured section 250 is efficiently reduced. In this case, each of the tilt angles α of the first and second tilted side surfaces 271 and 272 of the structural units 270 with respect to the reference plane 51 is 30°.

Therefore, according to the second embodiment, the fine concave/convex portions 8, 8, . . . are formed on the surface of the antireflection structured section 250, and therefore, a refraction index is gradually changed in the surface layer portion of the inner circumference surface of the lens barrel 205, thereby making it possible to reduce the reflectance. The fine concave/convex portions, 8, 8, . . . are formed on the respective surfaces of the structural units 70, 70, . . . each including the first and second side tilted surfaces 271 and 272 tilted with respect to the reference plane 51 of the antireflection structured section 250, and the incident angle of the incident light L becomes substantially small, thereby making it possible to reduce dependence of the reflectance on angle.

Further, with the formation of the structural units 270, 270, . . . on the surface of the antireflection structured section 250 on which the fine concave/convex portions 8, 8, . . . are formed, the tilt angles of the surface of the antireflection structured section 250 are easily formed to have a desired value, the antireflection structured section 250 can be easily manufactured to have desired functions, and productivity can be improved, compared to the structure in which a rough surface is formed on the antireflection structured section 250 and the fine concave/convex portions 8, 8, . . . are formed on the rough surface. In addition, with the formation of the structural units 270, 270, . . . on the surface of the antireflection structured section 250 on which the fine concave/convex portions 8, 8, . . . are formed, the reflectance can be reduced more efficiently than the structure in which the fine concave/convex portions 8, 8, . . . are formed on the surface of the antireflection structured section 250 which is formed to have a rough surface.

Other Embodiments

The first and second embodiments of the present invention may be modified as described below.

In the above embodiments, the antireflection structure of the present invention has been described using the lens barrel having light transmitting properties as an example. However, the antireflection structure according to the present invention is not limited to a light transmitting structure but may be, for example, a light absorbing structure, i.e., a so-called black body.

Further, in the first embodiment, the side surfaces 71-74 (271 and 272) constituting each of the structural units 70 (270) are formed to be similar to one another, and the respective tilt angles with respect to the reference plane 51 are formed to be the same, but they are not limited to such a structure. For example, the antireflection structure may have a structure in which shapes of respective side surfaces are not similar to one another, and a tilt angle of one of the side surfaces with respect to the reference plane 51 is different from a tilt angle of another one of the side surfaces facing the one of the side surfaces with respect to the reference plane 51.

Figure 12:
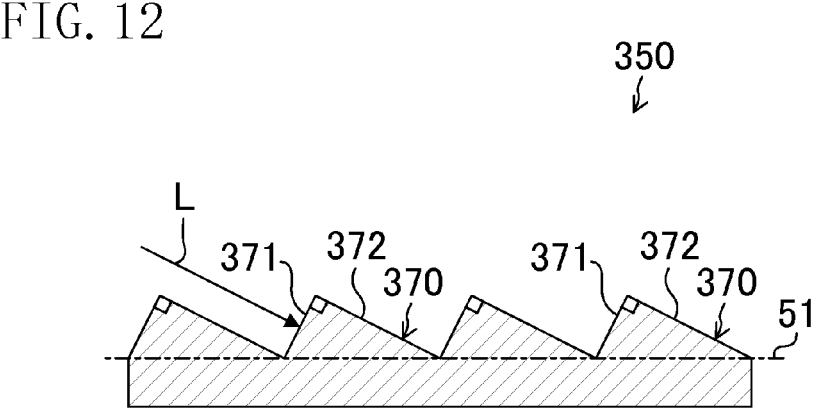
FIG. 12 is an enlarged cross-sectional view showing a base structure portion of an antireflection structure according to another embodiment.

Further, when the incident direction of the incident light L entering the surface of an antireflection structured section 350 can be estimated in advance, a tilted surface 371 of a structural unit 370 constituting a base structure portion 307 may be formed such that the normal direction of the surface corresponds to the estimated incident direction of incident light L, as shown in FIG. 12. With this structure, the incident angle of the incident light L entering the structural units 370 is 0°, thereby further reducing the reflectance of the incident light L together with the effect caused by the fine concave/convex portions 8, 8, . . . . In this structure, it is preferable that the angle between the tilted surface 371 facing the incident direction of the incident light L and the tilted surface 372 corresponding to the tilted surface 371 is a right angle. With this structure, the projected area of the facing tilted surface 372 viewed along the incident direction of the incident light L is zero, and therefore, thereby preventing the incident angle of the incident light L entering the structural unit 370 from becoming larger than that of the incident light L entering the reference plane 51.

Figure 13:
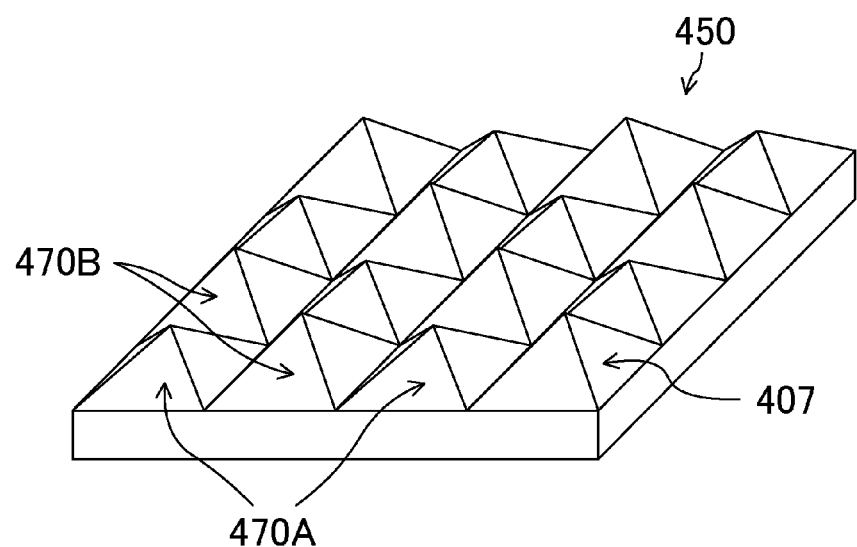
FIG. 13 is a perspective schematic view showing an antireflection structure according to still another embodiment.

Further, the tilt angles of the structural units 70, 70, . . . are not necessarily the same in all of the structural units 70, 70, . . . . For example, the incident angle of the tilted surface may be changed according to the incident angle of the incident light L which is estimated depending on a position in which each of the structural units 70 are located. In this case, the tilt angle of each of the tilted surfaces is preferably set so that the incident angle of the incident light L with respect to each of the tilted surfaces is 0 degree. When there are a plurality of the estimated incident angles, the base structure portion 407 formed on the surface of the antireflection structured section 450 may be formed such that structural units 470A and 470B in which tilt angles of side surfaces are different from each other are alternately arranged, as shown in FIG. 13.

In the embodiments, the example where the SWS is formed throughout the entire surface has been described. However, the SWS does not have to be provided throughout the entire surface, but may be formed only in necessary part. In such case, other part of the surface may be formed to have the structural units 70, 70, . . . (270, 270, . . . ) as well as the part in which the SWS is provided, and in this structure, the tilt angles of the structural units 70, 70, . . . (270, 270, . . . ) in the other part of the surface may be differentiated from the tilt angles in the part of the surface on which the SWS is formed. Furthermore, some other antireflection structure including such as a multilayer film of a film having a relatively low reflectance and a film having a relatively large reflectance may be formed in part in which the SWS is not formed. Moreover, even in the part in which the SWS is formed, a height and a cycle (pitch) of the SWS may be adjusted if necessary.

Furthermore, the antireflection structure including the base structure portion 7 and the fine concave/convex portions 8, 8, . . . according to the above-described embodiments is not limited to the structure applied to the lens barrel 5. For example, the structure may be applied to a diffusing plate which is arranged in front of a display, or the like, and reduces the reflection (display of external light or the like) of light in the surface of the display, or may be applied to components of some other optical device such as a display device, an imaging apparatus, an illumination device, a projector and the like. Specifically, the structure may also be applicable to a light emitting element such as a semiconductor laser device, a LED device, an electric bulb, a cold-cathode tube and the like, an optical detector such as an image sensor, such as a charge-coupled device (CCD), a CMOS and the like, a power meter, an energy meter, a reflectance measuring device and the like, a microlens array, a photo disc and the like.

The foregoing embodiments are merely preferred examples in nature, and are not intended to limit the scope, applications, and use of the invention.

Industrial Applicability

As described above, the present invention is useful for an antireflection structure for reducing reflection of light having a wavelength equal to or larger than a predetermined wavelength, and absorbing the light whose reflection the reflection is reduced, an optical unit, and an optical device.

The invention claimed is:

1. An antireflection structure for reducing reflection of light having a wavelength equal to or larger than a predetermined wavelength, and absorbing the light whose reflection is reduced, the structure comprising:
a base structure portion which is configured to have a plurality of structural units arranged on a reference plane, and each having tilted surfaces with respect to the reference plane, and
a plurality of fine concave/convex portions formed on a surface of the base structure portion, and arranged within a cycle equal to or smaller than the predetermined wavelength,
wherein
all side surfaces of each of the structural units are the tilted surfaces, and
an angle between at least one of the tilted surfaces and the reference plane is a predetermined angle ranging from 5 degrees to 45 degrees, both inclusive.

2. The antireflection structure of claim 1, wherein the structural unit is formed into a pyramidal or conical shape including the tilted surfaces.

3. The antireflection structure of claim 2, wherein the structural unit is formed into a square pyramidal shape including the tilted surfaces.

4. The antireflection structure of claim 2, wherein the structural unit is formed into a right pyramid or right cone.

5. The antireflection structure of claim 1, wherein the structural unit is formed into a ridge formed of the tilted surface and a second tilted surface adjacent to the tilted surface.

6. The antireflection structure of claim 5, wherein the structural unit is formed so that a cross section of the ridge is an isosceles triangle.

7. The antireflection structure of claim 1, wherein the base structure portion has a plurality of different types of structural units, and the predetermined angle differs among the structural units.

8. The antireflection structure of claim 1, wherein each of the fine concave/convex portions is a conical concave or convex, a prismoid concave or convex, or a linear concave or a linear convex.

9. The antireflection structure of claim 1, wherein each of heights of the fine concave/convex portions is equal to or larger than 0.4 times as large as the wavelength of the light whose reflection is reduced.

10. The antireflection structure of claim 1, wherein the antireflection structure is formed into a circular cylindrical shape so that the fine concave/convex portions constitute an inner circumference surface.

11. An optical unit comprising:
an optical system; and
the antireflection structure of claim 1 arranged so that light comes from a predetermined direction, wherein
the fine concave/convex portions are regularly arranged within a cycle equal to or smaller than the wavelength of light from the optical system.

12. The optical unit of claim 11, wherein the normal direction of the tilted surface corresponds to the predetermined direction.

13. The optical unit of claim 11, further comprising a lens barrel containing the optical system therein, wherein the antireflection structure is arranged in an inner circumference surface of the lens barrel.

14. An optical device comprising the optical unit of claim 11.

* * * * *